United States Patent
Kang et al.

(10) Patent No.: US 12,491,895 B2
(45) Date of Patent: Dec. 9, 2025

(54) APPARATUS AND METHOD FOR DETERMINING A SPECIFICATION OF AN OPTION-IN-VEHICLE

(71) Applicants: HYUNDAI MOTOR COMPANY, Seoul (KR); KIA CORPORATION, Seoul (KR)

(72) Inventors: Young Koo Kang, Yongin-si (KR); Tae Hee Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 169 days.

(21) Appl. No.: 18/368,337

(22) Filed: Sep. 14, 2023

(65) Prior Publication Data
US 2024/0416932 A1   Dec. 19, 2024

(30) Foreign Application Priority Data
Jun. 19, 2023   (KR) .................. 10-2023-0078361

(51) Int. Cl.
| | |
|---|---|
| *B60W 50/04* | (2006.01) |
| *B60R 16/023* | (2006.01) |
| *B60W 10/02* | (2006.01) |
| *B60W 10/04* | (2006.01) |

(52) U.S. Cl.
CPC ....... *B60W 50/045* (2013.01); *B60R 16/0231* (2013.01); *B60W 10/02* (2013.01); *B60W 10/04* (2013.01); *B60W 2556/45* (2020.02)

(58) Field of Classification Search
CPC .................. B60W 50/045; B60R 16/0231
See application file for complete search history.

(56) References Cited

U.S. PATENT DOCUMENTS

| | | | | |
|---|---|---|---|---|
| 2005/0222718 | A1* | 10/2005 | Lazarz ................ | G06F 21/34 701/1 |
| 2008/0208419 | A1* | 8/2008 | Wolf ................... | F16H 59/02 701/52 |
| 2018/0293816 | A1* | 10/2018 | Garrett ............... | G07C 5/0808 |
| 2019/0004784 | A1* | 1/2019 | Rocci .................. | B60L 53/60 |
| 2020/0385013 | A1* | 12/2020 | Janampally ......... | B60W 50/16 |
| 2021/0333171 | A1* | 10/2021 | Ramesh .............. | G06Q 10/06 |
| 2022/0147040 | A1* | 5/2022 | Takada ................ | G06F 12/00 |
| 2023/0098599 | A1* | 3/2023 | Pal ..................... | H04L 9/3242 717/172 |
| 2024/0143311 | A1* | 5/2024 | Ishikawa ............. | G06F 8/65 |
| 2024/0419429 | A1* | 12/2024 | Mesde ................ | G06F 8/65 |

FOREIGN PATENT DOCUMENTS

KR   101294088 B1   8/2013

* cited by examiner

*Primary Examiner* — Jess Whittington
(74) *Attorney, Agent, or Firm* — Lempia Summerfield Katz LLC

(57) ABSTRACT

An apparatus and a method are for determining a specification of an option-in-vehicle. The apparatus includes an input part that receives a vehicle identification number (VIN), a receiver that receives a message through a vehicle network, and a controller. The controller monitors reception of the message as the VIN is received and determines the specification of the option-in-vehicle based on the message.

16 Claims, 4 Drawing Sheets

APPARATUS AND METHOD FOR DETERMINING A SPECIFICATION OF AN OPTION-IN-VEHICLE

CROSS-REFERENCE TO RELATED APPLICATION

This application claims the benefit of priority to Korean Patent Application No. 10-2023-0078361, filed in the Korean Intellectual Property Office on Jun. 19, 2023, the entire contents of which are incorporated herein by reference.

TECHNICAL FIELD

The present disclosure relates to a technology for determining a specification of an option-in-vehicle based on a controller area network (CAN).

BACKGROUND

In general, commercial vehicles available in multiple models and small-quantity production have various kinds of engines and options. Because of this, such commercial vehicles have a limit in diversifying hardware and data. Accordingly, in an end-of-line (EOL) process, an operator sets a parameter of control logic that corresponds to the engine characteristics and sets a parameter of control logic that corresponds to an option of a vehicle in an engine control unit (ECU) one by one by using EOL equipment. In other words, an operator may set a parameter of control logic corresponding to a displacement and a horsepower of an engine in an ECU in an engine EOL process. An operator may then set a parameter of control logic corresponding to a specification of an option of the vehicle in the ECU in a vehicle EOL process.

In the EOL process, a time required to perform the process increases as the number of EOL items increases. In particular, when cyber security regulations are enforced, the EOL process causes a change in integrity verification data (IVD). An operator may perform the EOL process by using a software update management system (SUMS). The EOL items may include a power take-off (PTO), a speed of a vehicle, an auxiliary brake, a transmission, a fan clutch, an immobilizer, a cruise control, on-board diagnostics (OBDs), and an engine control unit (ECU) data set.

For reference, the PTO refers to a device that draws engine power not for driving but for a separate purpose. The operator distinguishes a special vehicle equipped with the PTO (for example, a mixer truck or a dump truck) and inputs logic that is suitable therefor into an engine control unit (ECU). Furthermore, the operator inputs factors (e.g., a dynamic radius of tires, a rear axle ratio, and a vehicle speed sensor correction value) into the engine control unit (ECU) for calculating the vehicle speed displayed on a cluster. Also, a speed limit according to road regulations have to be input into the engine control unit (ECU). Furthermore, the operator may input logic corresponding to the specification of an auxiliary brake, such as a retarder, into the engine control unit (ECU). Furthermore, the operator may input start logic, gear calculation logic, and a fuel amount mapping value according to a specification of a transmission into the engine control unit (ECU). Furthermore, the operator may distinguish a mechanical fan clutch and an electronic fan clutch and input control logic corresponding thereto into the engine control unit (ECU). Furthermore, the operator may recognize whether an immobilizer is installed and input control logic corresponding thereto into the electronic control unit (ECU) when it is installed. Furthermore, the operator may recognize whether a cruise control is installed and input control logic corresponding thereto into the electronic control unit (ECU) when it is installed. Furthermore, the operator may input activation logic into the engine control unit (ECU) to prevent limitation in output due to non-installation of a dosing control unit (DCU).

Accordingly, there is a need for a method for reducing the number of items in an EOL process performed by an operator and shortening a time required for the EOL process.

The items described in the Background section are included to promote understanding of the background of the present disclosure. The Background section may include items that are not a conventional technology that is already known to a person having ordinary skill in the art to which the technology pertains.

SUMMARY

The present disclosure has been made to solve the above-mentioned problems occurring in the prior art while advantages achieved by the prior art are maintained intact.

Aspects of the present disclosure provide an apparatus and a method for determining a specification of an option-in-vehicle. Specifications of various options in a vehicle may be determined based on a controller area network (CAN) message. The number of options (i.e., end-of-line (EOL) items), specifications of which have to be directly determined by an operator, and also a time required for an EOL process, may thus be shortened.

Other aspects of the present disclosure provide an apparatus and a method for determining a specification of an option-in-vehicle. Specifications of various options in a vehicle may be determined based on a CAN message. Also, control logic of an engine corresponding to a specification of an option-in-vehicle may be determined. The number of options (i.e., EOL items), specifications of which have to be directly determined by an operator, and also a time required for an EOL process, may thus be shortened.

Still other aspects of the present disclosure provide an apparatus and a method for determining a specification of an option-in-vehicle, by which reception of a CAN message may be monitored. A vehicle identification number (VIN) may be input and specifications of various options in a vehicle may be determined based on the CAN message. The number of options (i.e., EOL items), specifications of which have to be directly determined by an operator, and also a time required for an EOL process, may thus be shortened.

Further aspects of the present disclosure provide an apparatus and a method for determining a specification of an option-in-vehicle, by which reception of a CAN message may be monitored as a VIN is input. Specifications of various options in a vehicle may be determined based on the CAN message. Control logic of an engine corresponding to a specification of an option-in-vehicle may be determined. The number of options (i.e., EOL items), specifications of which have to be directly determined by an operator, and also a time required for an EOL process, may thus be shortened.

Yet other aspects of the present disclosure provide an apparatus and a method for determining a specification of an option-in-vehicle, by which a CAN message may be monitored as a VIN is input. A specification of a transmission may be determined based on an electric throttle control (ETC) 2 message and an ETC7 message. The number of options (i.e., EOL items), specifications of which have to be directly determined by an operator, and also a time required for an EOL process, may thus be shortened.

Still further aspects of the present disclosure provide an apparatus and a method for determining a specification of an option-in-vehicle, by which a CAN message may be monitored as a VIN is input. A specification of a transmission may be determined based on an electric throttle control (ETC) 2 message and an ETC7 message. Control logic of an engine corresponding to a specification of a transmission may be determined. The number of options (i.e., EOL items), specifications of which have to be directly determined by an operator, and also a time required for an EOL process, may thus be shortened.

Still other aspects of the present disclosure provide an apparatus and a method for determining a specification of an option-in-vehicle, by which a CAN message may be monitored as a VIN is input. A specification of a transmission may be determined as an auto transmission (AT) when an ETC2 message is received. The specification of the transmission may be determined as an automated manual transmission (AMT) when an ETC7 message is received. The specification of transmission may be determined as a manual transmission (MT) when neither the ETC2 message nor the ETC7 message is received. The number of options (i.e., EOL items), specifications of which have to be directly determined by an operator, and also a time required for an EOL process, may thus be shortened.

Other aspects of the present disclosure provide an apparatus and a method for determining a specification of an option-in-vehicle, by which a CAN message may be monitored as a vehicle identification number (VIN) is input. A specification of a transmission may be determined as an AT when an ETC2 message is received. The specification of the transmission may be determined as an AMT when an ETC7 message is received. The specification of transmission may be determined as a MT when neither the ETC2 message nor the ETC7 message is received. Control logic of an engine corresponding to the specification of the transmission may be determined. The number of options (i.e., EOL items), specifications of which have to be directly determined by an operator, and also a time required for an EOL process, may thus be shortened.

The objects of the present disclosure are not limited to the above-mentioned objects. The unmentioned objects and advantages of the present disclosure should be understood by the following description, and should be more apparent with reference to the embodiments of the present disclosure. In addition, it should be understood that the objects and advantages of the present disclosure are implemented through means described in the claims and combinations thereof.

The technical problems to be solved by the present disclosure are not limited to the aforementioned problems. Any other technical problems not mentioned herein should be clearly understood from the following description by those with ordinary skill in the art to which the present disclosure pertains.

According to an aspect of the present disclosure, an apparatus for determining a specification of an option-in-vehicle is disclosed. The apparatus includes an input part that receives a vehicle identification number (VIN), a receiver that receives a message through a vehicle network, and a controller. The controller monitors reception of the message as the VIN is received and determines the specification of the option-in-vehicle based on the message.

In an embodiment of the present disclosure, the controller may determine control logic of an engine, which corresponds to the specification of the option-in-vehicle.

In an embodiment of the present disclosure, the specification of the option may be a specification of a transmission in the vehicle.

In an embodiment of the present disclosure, the controller may determine the specification of the transmission as an auto transmission (AT) when receiving an electric throttle control 2 (ETC2) message. The controller may determine control logic of an engine, which corresponds to the AT.

In an embodiment of the present disclosure, the controller may determine the specification of the transmission as an automated manual transmission (AMT) when receiving an electric throttle control 7 (ETC7) message. The controller may determine control logic of an engine, which corresponds to the AMT.

In an embodiment of the present disclosure, the controller may determine the specification of the transmission as an MT when receiving neither an electric throttle control 2 (ETC2) message nor an electric throttle control 7 (ETC7) message. The controller may determine control logic of an engine, which corresponds to the MT.

In an embodiment of the present disclosure, the controller may become active when a key of an engine is switched on.

In an embodiment of the present disclosure, the controller may temporarily apply default logic as control logic of an engine before the VIN is input.

According to an aspect of the present disclosure, a method for determining a specification of an option-in-vehicle is disclosed. The method includes: inputting a vehicle identification number (VIN), by an input part; monitoring reception of a message through a vehicle network, by a controller; and determining the specification of the option-in-vehicle based on the message, by the controller.

In an embodiment of the present disclosure, determining the specification of the option-in-vehicle may further include determining control logic of an engine, which corresponds to the specification of the option-in-vehicle.

In an embodiment of the present disclosure, determining the specification of the option-in-vehicle may further include determining the specification of the transmission as an auto transmission (AT) when receiving an electric throttle control 2 (ETC2) message.

In an embodiment of the present disclosure, determining the specification of the option-in-vehicle may further include determining control logic of an engine, which corresponds to the AT.

In an embodiment of the present disclosure, determining the specification of the option-in-vehicle may further include determining the specification of the transmission as an automated manual transmission (AMT) when receiving an electric throttle control 7 (ETC7) message.

In an embodiment of the present disclosure, determining the specification of the option-in-vehicle may further include determining control logic of an engine, which corresponds to the AMT.

In an embodiment of the present disclosure, determining the specification of the option-in-vehicle may further include determining the specification of the transmission as an MT when receiving neither an electric throttle control 2 (ETC2) message nor an electric throttle control 7 (ETC7) message.

In an embodiment of the present disclosure, determining the specification of the option-in-vehicle may further include determining control logic of an engine, which corresponds to the MT.

BRIEF DESCRIPTION OF THE DRAWINGS

The above and other objects, features, and advantages of the present disclosure should be more apparent from the following detailed description taken in conjunction with the accompanying drawings, in which.

DETAILED DESCRIPTION

Figure 1:
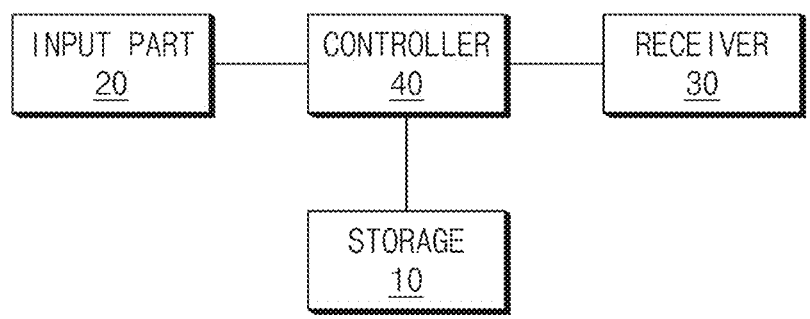
FIG. 1 is a diagram of an apparatus for determining a specification of an option-in-vehicle according to an embodiment of the present disclosure.

Hereinafter, various embodiments of the present disclosure are described with reference to the accompanying drawings. In adding reference numerals to the components of the drawings, it is noted that the same components are denoted by the same reference numerals even when they are drawn in different drawings. Furthermore, in describing the embodiments of the present disclosure, where it has been determined that a detailed description of related known configurations and functions may hinder understanding of the embodiments of the present disclosure, a detailed description thereof has been omitted. When a component, device, element, or the like, of the present disclosure, is described as having a purpose or performing an operation, function, or the like, the component, device, or element should be considered herein as being "configured to" meet that purpose or to perform that operation or function.

Furthermore, in describing the components of the embodiments of the present disclosure, terms, such as first, second, "A", "B", (a), and (b) may be used. The terms are simply for distinguishing the components. The essence, the sequence, and the order of the corresponding components are not limited by the terms. Unless defined differently, all the terms including technical or scientific terms have the same meanings as those generally understood by a person of ordinary skill in the art to which the present disclosure pertains. The generally used terms herein, such as the terms defined in advance, should be construed to coincide with the contextual meanings of the related technologies. Such terms should not be construed as ideal or excessively formal meanings unless defined explicitly in the present disclosure.

FIG. 1 is a diagram of an apparatus for determining a specification of an option-in-vehicle according to an embodiment of the present disclosure.

As illustrated in FIG. 1, the apparatus for determining a specification of an option-in-vehicle may include a storage 10, an input part 20, a receiver 30, and a controller 40. According to a scheme of implementing the apparatus for determining a specification of an option-in-vehicle according to an embodiment of the present disclosure, components may be coupled to each other to be implemented as a single body or some of the components may be omitted.

In a description of the components, first, the storage may store various logic, algorithms, and programs that are required in a process of determining specifications of various options in a vehicle based on a controller area network (CAN) message received through the receiver 30.

The storage 10 may monitor the CAN message received through the receiver 30 as a vehicle identification number (VIN) is input through the input part 20. The storage 10 may store the various logic, algorithms, and programs required in the process of determining the specifications of the various options in the vehicle based on the CAN message.

The storage 10 may monitor the CAN messages received through the receiver 30 as the VIN is input through the input part 20. The storage 10 may store the various logic, algorithms, and programs required in the process of determining a specification of a transmission in the vehicle based on an electric throttle control 2 (ETC2) message and an electric throttle control 7 (ETC7) message. The ETC2 message means a CAN message that is transmitted to an ECU through a vehicle network, by a telematic control unit (TCU) provided in an automatic transmission (AT). The ETC7 message means a CAN message that is transmitted through the vehicle network, by a TCU provided in an automated manual transmission (AMT). For reference, because the manual transmission (MT) is not provided with any TCU, it cannot transmit the CAN message.

The storage 10 may monitor the CAN message received through the receiver 30 as the VIN is input through the input part 20. The storage 10 may store various logic, algorithms, and programs required in a process of determining the specification of the transmission as the AT when receiving the ETC2 message, determining the specification of the transmission as the AMT when receiving the ETC7 message, and determining the specification of the transmission as an MT when receiving neither the ETC2 message nor the ETC7 message.

The above-discussed specification of an option-in-vehicle, for example, may be a specification of the transmission. The specification of an option-in-vehicle may include an auto transmission (AT), a manual transmission (MT), and an automated manual transmission (AMT). The specification of an option-in-vehicle may include whether an immobilizer is installed in the vehicle, whether a retarder is installed in the vehicle, and/or whether a cruise controller (CC) is installed in the vehicle. The immobilizer refers to an apparatus for interrupting an operation of an engine without any key corresponding to the vehicle to prevent stealing of the vehicle. The retarder refers to an auxiliary brake that is installed on the engine or the transmission of a commercial vehicle. The CC refers to an apparatus that maintains a preset speed by the driver in advance even though the driver does not work an acceleration pedal.

The storage 10 may include a storage medium of at least one of a memory, such as a flash memory type, a hard disk type, a micro-type, and/or a card type (e.g., a secure digital (SD) card or an eXtream digital (XD) card, and a memory, such as a random-access memory (RAM), a static RAM (SRAM), a read-only memory (ROM), a programmable ROM (PROM), an electrically erasable PROM (EEPROM), a magnetic RAM (MRAM), a magnetic disk, and/or an optical disk type.

The storage 10 may store a parameter indicating control logic of the engine, which corresponds to the specification of the option-in-vehicle, which is determined by the controller 40. For example, when parameters indicating the control logic of the engine corresponding to the MT, AMT, and AT are 1, 2, and 3 respectively, the storage 10 may permanently store 1 when the specification of the transmission determined by the controller 40 is the MT.

The input part 20 is a module that receives a vehicle identification number (VIN). The input part 20 may directly receive the VIN from an operator or be electrically connected to end-of-line (EOL) equipment of the operator to receive the VIN from the EOL equipment.

The receiver 30 is a module that provides a communication interface with a vehicle network. The receiver 30 may receive a CAN message from the vehicle network. For example, the CAN message may include an ETC2 message and an ETC7 message.

The controller 40 may perform an overall control such that the components may normally perform their functions. The controller 40 may be implemented in a form of hardware, may be implemented in a form of software, or may be implemented in a form in which hardware and software are combined. The controller 40 may be implemented by a microprocessor, but the present disclosure is not limited thereto. For example, the controller may be implemented by an engine control unit (ECU).

The controller 40 may monitor the CAN message received through the receiver 30 when receiving the VIN through the input part 20. The controller 40 may determine the specification of the option-in-vehicle based on the CAN message. The controller 40 may further determine the control logic of the engine corresponding to the specification of the option-in-vehicle.

The controller 40 may monitor the CAN message received through the receiver 30 when receiving the VIN through the input part 20. The controller 40 may determine the specification of the transmission based on the ETC2 message and the ETC7 message in the CAN message.

The controller 40 may monitor the CAN message received through the receiver 30 as the VIN is input through the input part 20. The controller 40 may determine the specification of the transmission as the AT when receiving the ETC2 message, may determine the specification of the transmission as the AMT when receiving the ETC7 message, and may determine the specification of the transmission as the MT when receiving neither the ETC2 message nor the ETC7 message. This may be expressed as in Table 1.

TABLE 1

| Parameter | MT | AMT | AT |
| --- | --- | --- | --- |
| Recognition of ETC2 | False | True | True |
| Recognition of ETC7 | False | True | False |
| Diagnosis of ETC2 | False | True | True |
| Diagnosis of ETC7 | False | True | False |

Hereinafter, referring to FIGS. 2 and 3, a process of determining a specification of an option-in-vehicle by the controller 40 is discussed.

Figure 2:
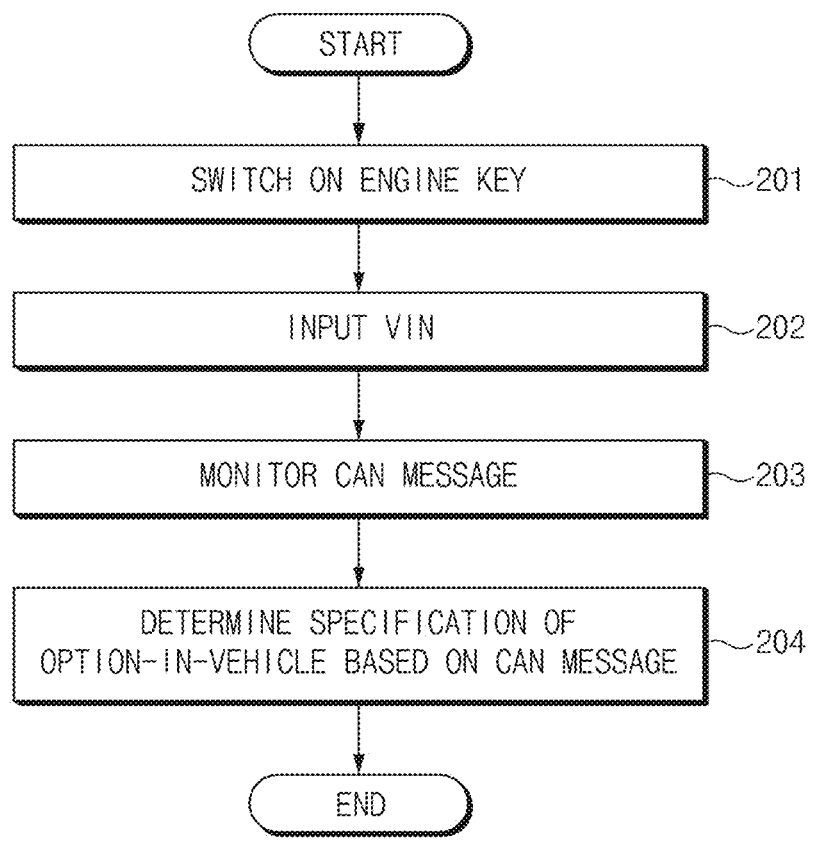
FIG. 2 is a flowchart of a method for determining a specification of an option-in-vehicle according to an embodiment of the present disclosure.

FIG. 2 is a flowchart of a method for determining a specification of an option-in-vehicle according to an embodiment of the present disclosure.

First, the controller 40 becomes active when a key of the engine is switched on (201). The on state of the engine key, for example, means an on state of a start key or an on state of the engine.

Thereafter, the controller 40 receives a VIN through the input part 20 (202). The controller 40 may temporarily apply default logic that may be applied regardless of the specification of the option as the control logic of the engine before the VIN is input.

Thereafter, the controller 40 monitors a CAN message received through the receiver 30 (203).

Thereafter, the controller 40 determines the specification of the option in the vehicle based on the CAN message (204). The controller 40 may further determine the control logic of the engine corresponding to the specification of the option-in-vehicle.

Figure 3:
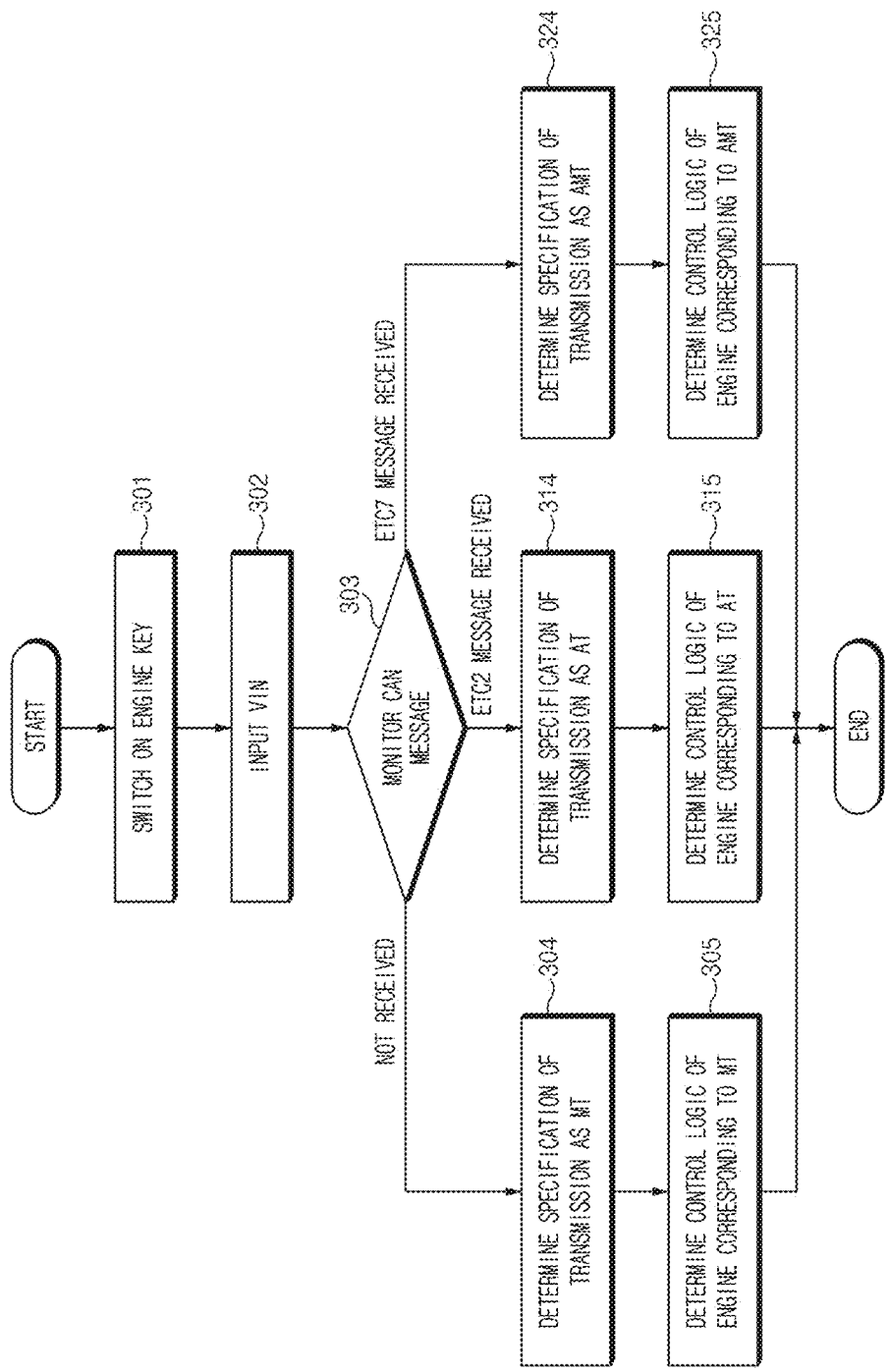
FIG. 3 is a flowchart of a method for determining a specification of a transmission in a vehicle according to an embodiment of the present disclosure.

FIG. 3 is a flowchart of a method for determining a specification of a transmission in a vehicle according to an embodiment of the present disclosure.

First, the controller 40 becomes active when the key of the engine is switched on (301).

Thereafter, the controller 40 receives a VIN through the input part 20 (302).

Thereafter, the controller 40 monitors a CAN message received through the receiver 30 (303).

When receiving neither an ETC2 message nor an ETC7 message, the controller 40 determines the specification of the transmission as an MT. Furthermore, the controller 40 determines the control logic of the engine corresponding to the MT (305).

When receiving the ETC2 message, the controller 40 determines the specification of the transmission as an AT (314). Furthermore, the control logic of the engine corresponding to the AT is determined (315).

When receiving the ETC7 message, the controller 40 determines the specification of the transmission as an AMT (324). Furthermore, the control logic of the engine corresponding to the AMT is determined (325). In each case, the appropriate control logic for the identified transmission, i.e., in-vehicle-option, is downloaded or applied to the ECU of the vehicle.

Figure 4:
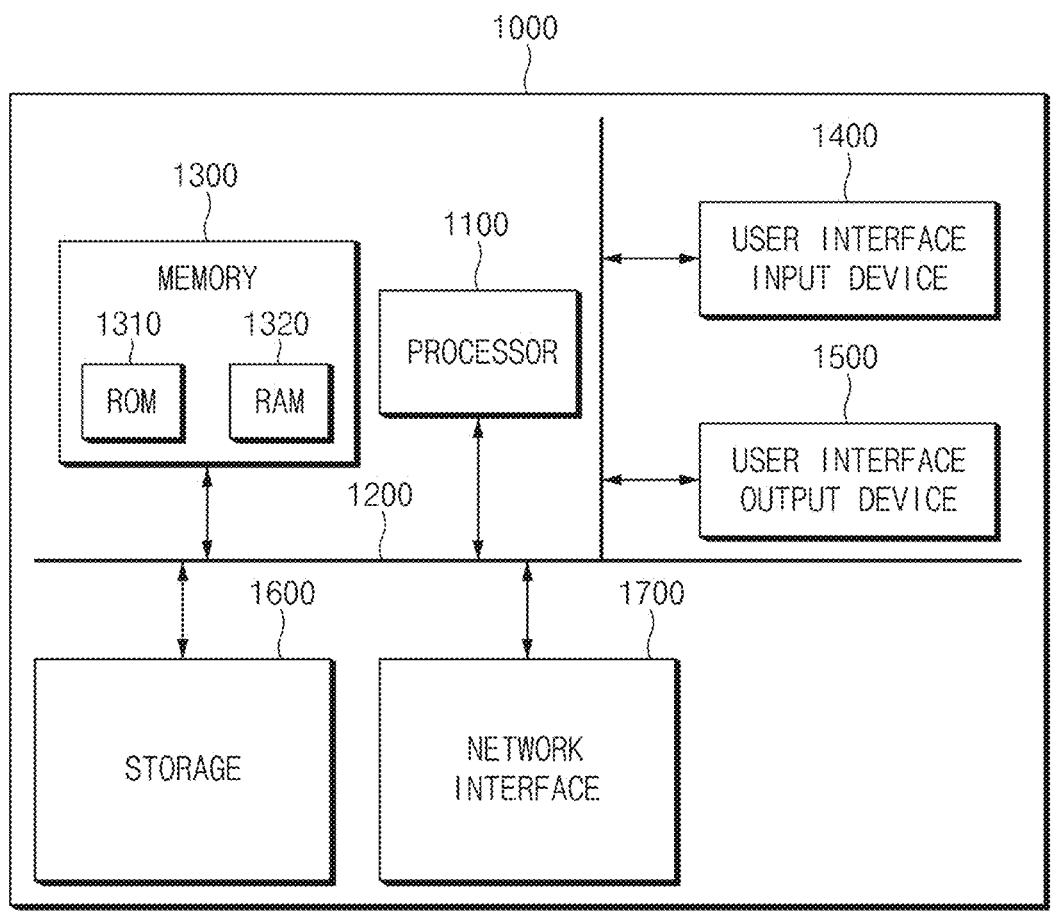
FIG. 4 is a block diagram illustrating a computing system for executing a method for determining a specification of an option-in-vehicle according to an embodiment of the present disclosure.

FIG. 4 is a block diagram illustrating a computing system for executing a method for determining a specification of an option-in-vehicle according to an embodiment of the present disclosure.

Referring to FIG. 4, the method for determining a specification of an option-in-vehicle according to an embodiment of the present disclosure may be implemented also through the computing system. A computing system 1000 may include at least one processor 1100, a memory 1300, a user interface input device 1400, a user interface output device 1500, a storage 1600, and a network interface 1700, which are connected through a system bus 1200.

The processor 1100 may be a central processing unit (CPU), or a semiconductor device that processes instructions stored in the memory 1300 and/or the storage 1600. The memory 1300 and the storage 1600 may include various volatile or nonvolatile storage media. For example, the memory 1300 may include a read-only memory (ROM) 1310 and a random-access memory (RAM) 1320.

Accordingly, the steps of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600). The storage medium may be a RAM, a flash memory, a ROM, an EPROM, an EEPROM, a register, a hard disk, a solid state drive (SSD), a detachable disk, or a compact-disk ROM (CD-ROM). The storage medium is coupled to the processor 1100 and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

According to the apparatus and the method for determining a specification of an option-in-vehicle of the present disclosure, specifications of various options in a vehicle may be determined based on a controller area network (CAN) message. The number of options (i.e., end-of-line (EOL) items), specifications of which have to be directly determined by an operator, and also a time required for an EOL process, may thus be shortened.

The above description is a simple exemplification of the technical spirit of the present disclosure. The embodiments of the present disclosure may be variously changed and modified by those of ordinary skill in the art to which the present disclosure pertains without departing from the essential features of the present disclosure. Accordingly, the embodiments disclosed in the present disclosure are not provided to limit the technical spirit of the present disclosure but provided to describe the present disclosure. The scope of the technical spirit of the present disclosure is not limited by the embodiments. Accordingly, the technical scope of the present disclosure should be construed by the attached claims. All the technical spirit within the range of equivalents fall within the scope of the present disclosure.

What is claimed is:

1. An apparatus for determining a specification of an option-in-vehicle, the apparatus comprising:
a receiver configured to receive a message through a vehicle network; and
a controller, wherein the controller is configured to
monitor reception of the message as a vehicle identification number (VIN) is received,
determine a specification of an option-in-vehicle based on the message, wherein the specification of the option is a specification of a transmission in the vehicle,
determine the transmission as one of an automatic transmission (AT), an automated manual transmission (AMT), or a manual transmission (MT);
determine a control logic of an engine corresponding to the determined transmission; and
download and store the control logic of the engine corresponding to the determined transmission.

2. The apparatus of claim 1, wherein the controller determines the specification of the transmission as an auto transmission (AT) when receiving an electric throttle control 2 (ETC2) message.

3. The apparatus of claim 2, wherein the controller determines control logic of an engine, which corresponds to the AT.

4. The apparatus of claim 1, wherein the controller determines the specification of the transmission as an automated manual transmission (AMT) when receiving an electric throttle control 7 (ETC7) message indicating that the transmission specification is an AMT.

5. The apparatus of claim 4, wherein the controller determines control logic of an engine, which corresponds to the AMT.

6. The apparatus of claim 1, wherein the controller determines the specification of the transmission as a manual transmission (MT) when receiving neither an electric throttle control 2 (ETC2) message indicating that the transmission specification is an AT nor an electric throttle control 7 (ETC7) message indicating that the transmission specification is an AMT.

7. The apparatus of claim 6, wherein the controller determines control logic of an engine, which corresponds to the MT.

8. The apparatus of claim 1, wherein the controller becomes active when a key of an engine is switched on.

9. The apparatus of claim 1, wherein the controller temporarily applies default logic as control logic of an engine before the VIN is input.

10. A method for determining a specification of an option-in-vehicle, the method comprising:
inputting a vehicle identification number (VIN), by an input part;
monitoring reception of a message through a vehicle network, by a controller;
determining a specification of an option-in-vehicle, the specification of the option-in-vehicle being a specification of a transmission of the vehicle based on the message, by the controller, wherein determining the specification of the option-in-vehicle includes:
determining the transmission as one of an automatic transmission (AT), an automated manual transmission (AMT), or a manual transmission (MT); and
determining a control logic of an engine corresponding to the determined transmission; and
downloading the control logic of the engine corresponding to the determined transmission; and
storing the control logic of the engine corresponding to the determined transmission.

11. The method of claim 10, wherein determining the specification of the option-in-vehicle further includes
determining, by the controller, the specification of the transmission as an auto transmission (AT) when receiving an electric throttle control 2 (ETC2) message indicating that the transmission specification is an AT.

12. The method of claim 11, wherein determining the specification of the option-in-vehicle further includes:
determining control logic of an engine, which corresponds to the AT.

13. The method of claim 10, wherein determining the specification of the option-in-vehicle further includes
determining, by the controller, the specification of the transmission as an automated manual transmission (AMT) when receiving an electric throttle control 7 (ETC7) message indicating that the transmission specification is an AMT.

14. The method of claim 13, wherein determining the specification of the option-in-vehicle further includes:
determining, by the controller, control logic of an engine, which corresponds to the AMT.

15. The method of claim 10, wherein determining the specification of the option-in-vehicle further includes:
determining, by the controller, the specification of the transmission as a manual transmission (MT) when receiving neither an electric throttle control 2 (ETC2) message indicating that the transmission specification is an AT nor an electric throttle control 7 (ETC7) message indicating that the transmission specification is an AMT.

16. The method of claim 15, wherein determining the specification of the option-in-vehicle further includes:
determining, by the controller, control logic of an engine, which corresponds to the MT.

* * * * *